(12) United States Patent
Era (10) Patent No.: US 8,570,360 B2
(45) Date of Patent: Oct. 29, 2013

(54) STEREOSCOPIC PARAMETER EMBEDDING DEVICE AND STEREOSCOPIC IMAGE REPRODUCER

(76) Inventor: Kazunari Era, Kashiwa (JP)

(*) Notice: Subject to any disclaimer, the term of this patent is extended or adjusted under 35 U.S.C. 154(b) by 1430 days.

(21) Appl. No.: 10/591,447

(22) PCT Filed: Feb. 18, 2005

(86) PCT No.: PCT/JP2005/002592
§ 371 (c)(1),
(2), (4) Date: Sep. 1, 2006

(87) PCT Pub. No.: WO2005/086496
PCT Pub. Date: Sep. 15, 2005

(65) Prior Publication Data
US 2008/0018731 A1 Jan. 24, 2008

(30) Foreign Application Priority Data
Mar. 8, 2004 (JP) .................................. 2004-064262

(51) Int. Cl.
*G02B 27/26* (2006.01)
(52) U.S. Cl.
USPC ........................... 348/43; 348/96; 235/462.01
(58) Field of Classification Search
USPC .................................. 348/43, 96; 235/462.01
See application file for complete search history.

(56) References Cited

U.S. PATENT DOCUMENTS

| | | | | |
|---|---|---|---|---|
| 5,682,030 A | * | 10/1997 | Kubon | 235/462.25 |
| 6,102,295 A | * | 8/2000 | Ogami | 235/472.01 |
| 6,108,005 A | * | 8/2000 | Starks et al. | 345/419 |
| 6,573,819 B1 | | 6/2003 | Oshima et al. | |
| 6,760,488 B1 | * | 7/2004 | Moura et al. | 382/285 |
| 7,053,937 B1 | * | 5/2006 | Aoki | 348/231.3 |
| 2002/0118275 A1 | * | 8/2002 | Harman | 348/51 |
| 2004/0247175 A1 | * | 12/2004 | Takano et al. | 382/154 |
| 2005/0063596 A1 | * | 3/2005 | Yomdin et al. | 382/232 |

FOREIGN PATENT DOCUMENTS

| | | | |
|---|---|---|---|
| JP | A-09-044932 | | 2/1997 |
| JP | 09-327041 | * | 12/1997 |
| JP | A 9-327041 | | 12/1997 |
| JP | A 11-191895 | | 7/1999 |
| JP | A 2002-123842 | | 4/2002 |
| WO | WO03045045 | * | 5/2003 |

OTHER PUBLICATIONS

Office Action issued in Canadian Patent Appln. No. 2,559,131; mailed Feb. 14, 2012.

* cited by examiner

*Primary Examiner* — Sath V Perungavoor
*Assistant Examiner* — Jeffery Williams
(74) *Attorney, Agent, or Firm* — Oliff & Berridge, PLC (57) ABSTRACT

A stereoscopic parameter embedding apparatus comprising: a video image input unit operable to input a plurality of pieces of video image data to be processed sequentially; a parameter input unit operable to input stereoscopic parameters for converting a video image into a stereoscopic image, each of which is respectively associated with each of the plurality of video image data; a converter operable to convert each of the input stereoscopic parameters into binary data; and an embedding unit operable to embed bar-code image data corresponding to the binary data in each of the plurality of pieces of video image data.

16 Claims, 6 Drawing Sheets

STEREOSCOPIC PARAMETER EMBEDDING DEVICE AND STEREOSCOPIC IMAGE REPRODUCER

TECHNICAL FIELD

The present invention relates to a technique of generating stereoscopic images on the basis of video image data.

BACKGROUND ART

A stereoscopic system in which an image for a left eye and an image for a right eye, having a given disparity therebeween, are combined and displayed is well known. A viewer wears complementary color glasses or polarized glasses, or uses a lenticular lens or a parallax barrier to partially block his/her vision to thereby cause binocular disparity.

A set of disparity images is typically created by imaging one object from two different viewpoints. However, a set of disparity images can be created from one image taken from a single viewpoint, as is suggested in Patent Document 1. A stereoscopic image generator described in Patent Document 1 calculates depth-values from saturations of pixels forming an image, discriminates on the basis of the depth-values (or corrected depth-values) between a near view and a distant view of the image, and enlarges a disparity between an image for a left eye and an image for a right eye in the near view than in the distant view. The algorithm of calculating a depth-value from saturation of a pixel is employed in view of an empirical rule that generally a more distant scene has a lower saturation and a nearer scene has a higher saturation.

Owing to techniques such as that described in Patent Document 1, it has recently become relatively easy to create, from one image, images which have a given disparity there between. Accordingly, it is expected that video content not originally intended for stereoscopic vision will in future be subject to a stereoscopic imaging process and marketed in a computer readable medium such as a DVD (Digital Video Disc). A purchaser of such a DVD will be able to view the video content as stereoscopic images using a computer.
Patent Document 1: Unexamined Patent Publication No. 2002-123842.

DISCLOSURE OF THE INVENTION

Problems to be Solved by the Invention

It should be noted that viewing video content as stereoscopic images places a heavier strain on the eyes of a viewer than does viewing the same content as normal two-dimensional images. Therefore, some users may wish to view video content which has been processed using stereoscopic imaging, simply as two-dimensional images. However, in a case where such stereoscopic processed video content is stored on a medium, it is not possible to then view such content as normal two-dimensional images.

The present invention has been made in view of the above-described circumstances, and provides video content which a user can view either as stereoscopic images or as two-dimensional images.

Means for Solving the Problems

A computer readable medium according to a preferred embodiment of the present invention comprises: a plurality of pieces of video image data to be processed sequentially; and stereoscopic parameters for converting a video image into a stereoscopic image, each of which is associated with each of the plurality of pieces of video image data.

A computer readable medium according to another preferred embodiment of the present invention comprises: a plurality of pieces of video image data to be processed sequentially; and sub-picture data to be combined with each of the plurality of pieces of video image data, wherein the sub-picture data contains stereoscopic parameters for converting a video image into a stereoscopic image.

In the embodiments, the computer readable medium may further comprise a program for causing a computer to execute a stereoscopic imaging process effecting the stereoscopic parameters on the video image data.

A stereoscopic parameter embedding apparatus according to another embodiment of the present invention comprises: a video image input unit operable to input a plurality of pieces of video image data to be processed sequentially; a parameter input unit operable to input stereoscopic parameters for converting a video image into a stereoscopic image, each parameter being associated respectively with each of the plurality of pieces of video image data; a converter operable to convert each of the input stereoscopic parameters into binary data; and an embedding unit operable to embed bar-code image data corresponding to the binary data in each of the plurality of pieces of video image data.

A stereoscopic parameter embedding apparatus according to another embodiment of the present invention comprises: a sub-picture input unit operable to input sub-picture data to be combined with each of a plurality of pieces of video image data to be processed sequentially; a parameter input unit operable to input stereoscopic parameters for converting a video image into a stereoscopic image, each parameter being associated respectively with each of the plurality of pieces of video image data; a converter operable to convert each of the input stereoscopic parameters into binary data; and an embedding unit operable to embed bar-code image data corresponding to the binary data in each of the pieces of sub-picture data.

In the embodiment, the stereoscopic parameter embedding apparatus may further comprises: a video image input unit operable to input a plurality of pieces of video image data to be combined with the sub-picture data; a video content data preparing unit operable to prepare video content data of signals, wherein the sub-picture data with the embedded bar-code image data and the video image data input via the video image input unit are multiplexed in accordance with predetermined standards.

A stereoscopic image reproducer according to another embodiment of the present invention comprises: a reader operable to read video image data to be processed sequentially from a computer readable medium, the computer readable medium comprising the video image data and bar-code image data, the bar-code image data being prepared through conversion of stereoscopic parameters for converting a video image into a stereoscopic image, into binary data; a bar-code identifying unit operable to identify the bar-code image data embedded in the read video image data; a parameter extracting unit operable to analyze the identified bar-code image data and extract the stereoscopic parameters; a stereoscopic processor operable to apply a stereoscopic imaging process on the video image data, the stereoscopic imaging process effecting the extracted stereoscopic parameters on the video image data in which the bar-code image data of the stereoscopic parameters is embedded; an output unit operable to output the stereoscopic-process-applied video image data to a display in a predetermined sequence.

A stereoscopic image reproducer according to another embodiment of the present invention comprises: a reader operable to read video content data from a computer readable medium, the video content data comprising video image data to be processed sequentially, and sub-picture data to be combined with the video image data and in which bar-code image data is embedded, the bar-code image data being prepared through conversion of stereoscopic parameters for converting a video image into a stereoscopic image, into binary data; an extracting unit operable to extract the video image data and the sub-picture data from the read video content data; a bar-code identifying unit operable to identify the bar-code image data embedded in the extracted sub-picture data; a parameter extracting unit operable to analyze the identified bar-code image data and extract the stereoscopic parameters; a stereoscopic processor operable to apply a stereoscopic imaging process on the video image data, the stereoscopic imaging process effecting the extracted stereoscopic parameters on the video image data to be combined with the sub-picture data where the bar-code image data of the stereoscopic parameters is embedded; a combiner operable to combine the stereoscopic-process-applied video image data with the sub-picture data; an output unit operable to output the video image data with the combined sub-picture data to a display in a predetermined sequence.

In the embodiment, the stereoscopic image reproducer may further comprise a bar-code eraser operable to alter the sub-picture data to erase the bar-code image data after the bar-code data is analyzed and the stereoscopic parameters are extracted from the bar-code image data, wherein the combiner combines the video image data with the altered sub-picture data.

Also, in the embodiment, the stereoscopic image reproducer may further comprise a reproduction system switcher operable to switch between reproduction of video image data for stereoscopic viewing and reproduction of video image data not for stereoscopic viewing, wherein the combiner, if reproduction of video image data for stereoscopic viewing is selected by the reproduction system switcher, combines the stereoscopic-process-applied video image data with the sub-picture data, and if reproduction of video image data not for stereoscopic viewing is selected by the reproduction system switcher, combines the pre-stereoscopic-process video image data with the sub-picture data.

A program according to another embodiment of the present invention causes a computer to execute a process, the computer comprising: a video image input unit operable to input a plurality of pieces of video image data to be processed sequentially; and a parameter input unit operable to input stereoscopic parameters for converting a video image into a stereoscopic image, each of which is associated with each of the plurality of pieces of video image data, the process comprising: converting each of stereoscopic parameters input via the parameter input unit into binary data; and embedding bar-code image data corresponding to the binary data in video image data input via the video image input unit.

A program according to another embodiment of the present invention causes a computer to execute a process, the computer comprising: a sub-picture input unit operable to input sub-picture data to be combined with each of a plurality of pieces of video image data to be processed sequentially; and a parameter input unit operable to input stereoscopic parameters for a video image into a stereoscopic image, each parameter being associated with each of the plurality of pieces of video image data, the process comprising: converting each of stereoscopic parameters input via the parameter input unit into binary data; and embedding bar-code image data corresponding to the binary data in sub-picture data input via the sub-picture input unit.

A program according to another embodiment of the present invention causes a computer to execute a process, the computer comprising: a reader operable to read video image data to be processed sequentially from a computer readable medium, the computer readable medium comprising the video image data and bar-code image data, the bar-code image data being prepared through conversion of stereoscopic parameters for converting a video image into a stereoscopic image, into binary data; and a display operable to display a video image, the process comprising: identifying bar-code image data embedded in video image data read by the reader; analyzing the identified bar-code image data to extract stereoscopic parameters; applying a stereoscopic imaging process to the video image data, the stereoscopic imaging process effecting the extracted stereoscopic parameters on the video image data in which the bar-code image data of the stereoscopic parameters is embedded; and outputting the stereoscopic-process-applied video image data to the display in a predetermined sequence.

A program according to another embodiment of the present invention causes a computer to execute a process, the computer comprising: a reader operable to read video content data from a computer readable medium, the video content data comprising video image data to be processed sequentially, and sub-picture data to be combined with the video image data and in which bar-code image data is embedded, the bar-code image data being prepared through conversion of stereoscopic parameters for converting a video image into a stereoscopic image, into binary data; and a display operable to display a video image; the process comprising: extracting video image data and the sub-picture data from the video content data read via the reader; identifying bar-code image data embedded in the extracted sub-picture data; analyzing the identified bar-code image data to extract stereoscopic parameters; applying a stereoscopic imaging process on the video image data, the stereoscopic imaging process effecting the extracted stereoscopic parameters on the video image data to be combined with the sub-picture data in which the bar-code image data of the stereoscopic parameters is embedded; combining the stereoscopic-process-applied video image data with the sub-picture data; outputting the video image data with the combined sub-picture data to the display in a predetermined sequence.

A method of distributing video content data according to another embodiment of the present invention, comprises: generating video content data representing signals by a first computer comprising: a video image input unit operable to input a plurality of pieces of video image data to be processed sequentially; a sub-picture input unit operable to input sub-picture data to be combined with each of the plurality of pieces of video image data; and a parameter input unit operable to input stereoscopic parameters for converting a video image into a stereoscopic image, each of which is associated with each of the pieces of plurality of video image data, the step of generating video content data comprising: converting stereoscopic parameters input from the sub-picture input unit into binary data; embedding bar-code image data corresponding to the binary data in sub-picture data input from the sub-picture input unit; and multiplexing the sub-picture data in which the bar-code image data is embedded and video image data input from the video image input unit in conformity with predetermined standards to generate the signals, storing the video content data in a computer readable medium and shipping it; causing the video content data stored in the computer readable medium to be processed by a second computer capable of reproducing the video content data; and displaying a stereoscopic image of a video image by the second computer, comprising: extracting the video image data and the sub-picture data from the video content data read from the computer readable medium; identifying the bar-code image data embedded in the extracted sub-picture data; analyzing the identified bar-code image data and extracting the stereoscopic parameters; applying a stereoscopic imaging process to the video image data, the stereoscopic imaging process effecting the extracted stereoscopic parameters on the video image data to be combined with the sub-picture data in which the bar-code image data of the stereoscopic parameters is embedded; combining the stereoscopic-imaging-process-applied video image data with the sub-picture data; and outputting the video image data with the combined sub-picture data to a display in a predetermined sequence.

A computer readable medium according to another embodiment of the present invention comprises: two-dimensional image data; and stereoscopic parameters for converting a two-dimensional image into a stereoscopic image, the stereoscopic parameters being associated with the two-dimensional image.

A stereoscopic parameter embedding apparatus according to another embodiment of the present invention comprises: an image input unit operable to input two-dimensional image data; a parameter input unit operable to input stereoscopic parameters for converting a two-dimensional image into a stereoscopic image; a converter operable to convert each of the input stereoscopic parameters into binary data; and an embedding unit operable to embed bar-code image data corresponding to the binary data in the input two-dimensional image data.

A stereoscopic image reproducer according to another embodiment of the present invention comprises: a reader operable to read two-dimensional image data from a computer readable medium, the computer readable medium comprising video image data in which bar-code image data is embedded, the bar-code image data being prepared through conversion of stereoscopic parameters for converting a two-dimensional image into a stereoscopic image, into binary data; a bar-code identifying unit operable to identify the bar-code image data embedded in the read two-dimensional image data; a parameter extracting unit operable to analyze the identified bar-code image data and extract the stereoscopic parameters; a stereoscopic processor operable to apply a stereoscopic imaging process to the two-dimensional image data, the stereoscopic imaging process effecting the extracted stereoscopic parameters on the two-dimensional image data in which the bar-code image data of the stereoscopic parameters is embedded; an output unit operable to output the stereoscopic-process-applied video image data to a display in a predetermined sequence.

A program according to another embodiment of the present invention causes a computer to execute a process, the computer comprising: an image input unit operable to input two-dimensional image data; and a parameter input unit operable to input stereoscopic parameters for converting a two-dimensional image into a stereoscopic image; the process comprising: converting each of stereoscopic parameters input via the parameter input unit into binary data; and embedding bar-code image data corresponding to the binary data in two-dimensional image data input via the video image input unit.

A program according to another embodiment of the present invention causes a computer to execute a process, the computer comprising: a reader operable to read two-dimensional image data from a computer readable medium, the computer readable medium comprising the two-dimensional image data in which bar-code image data is embedded, the bar-code image data being prepared through conversion of stereoscopic parameters for converting a two-dimensional image into a stereoscopic image, into binary data; and a display operable to display an image, the process comprising: identifying bar-code image data embedded in two-dimensional image data read by the reader; analyzing the identified bar-code image data to extract stereoscopic parameters; applying a stereoscopic imaging process on the two-dimensional image data, the stereoscopic imaging process effecting the extracted stereoscopic parameters on the two-dimensional image data in which the bar-code image data of the stereoscopic parameters is embedded; and outputting stereoscopic image data generated through the stereoscopic process to the display.

Effects of the Invention

In the present invention, video data of the video content and parameter data for the video content are stored separately on a computer medium. When it is desired to view the video content stereoscopically, the separately stored video parameter data are used to generate stereoscopic images from the stored video image data. Since the stereoscopic parameters and the video image data are stored separately, the video content can be reproduced to be viewed either stereoscopically or two-dimensionally.

EXPLANATION OF THE NUMERALS IN THE FIGURES

10 . . . Time reference signal supplier, 11 . . . Video data encoder, 12 . . . Audio data encoder, 13 . . . Parameter memory, 14 . . . Parameter input unit, 15 . . . Sub-picture data modifier, 16 . . . Sub-picture data encoder, 17 . . . Multiplexer, 20 . . . Pick up unit, 21 . . . Demodulator/error corrector, 22 . . . Demultiplexer, 23 . . . Audio data decoder, 24 . . . Video data decoder, 25 . . . Reproduction system switcher, 26 . . . Stereoscopic processor, 27 . . . Combiner, 28 . . . Sub-picture data decoder, 29 . . . Stereoscopic parameter extractor

BEST MODE FOR IMPLEMENTING THE INVENTION (Embodiment of the Invention)

Below, an embodiment of the present invention will now be described.

The present embodiment is characterized in that parameters for converting a two-dimensional image into a stereoscopic image are embedded in sub-picture data, which data are multiplexed and stored in a DVD (Digital Video Disc) for use when the DVD is played.

Now, key terms used in the following description will be defined. The term "creator" is used to refer to an entity that creates video content stored on a DVD. The term "user" is used to refer to a person or company which purchases and uses a DVD on which created video content is stored. The term "video data" is used to refer to data embodying video signals for main pictures; the term "audio data" is used to refer to data embodying audio signals; the term "sub-picture data" is used to refer to data embodying video signals for a sub-picture; and the term "video content data" is used to refer to data created when the foregoing 3 types of data are multiplexed in conformity with defined standards.

A method of distributing video content data according to the present embodiment includes: a video content creation process; a DVD shipping process; a video content obtaining process; and a stereoscopic image displaying process. With regard to the description which follows of an embodiment of the present invention, a video content creation process and a stereoscopic image displaying process are characteristic.

In the video content creation process, a creator obtains video data, audio data, and sub-picture data, as source data of video content, and embeds bar-code image data in the sub-picture. The bar-code image data represents parameters for converting a sequence of video images to be reproduced based on the video data into stereoscopic images.

In the DVD shipping process, a creator stores in a DVD, video content data containing the video data, the audio data, and the sub-picture data in which the bar-code image data is embedded, and ships the DVD for marketing.

In the video content obtaining process, a user purchases the DVD, and uses an apparatus capable of reproducing both stereoscopic images and two-dimensional images (hereinafter, referred to as "stereoscopic image reproducer") to read the video content data stored on the DVD.

In the stereoscopic image displaying process, the user causes the video content data read by the stereoscopic image reproducer to be displayed as stereoscopic images.

Each of these processes will now be described below.
(Video Content Creation Process)
The video content creation process will now be described. The process is carried out by a creator using a stereoscopic parameter embedding apparatus.

Figure 1:
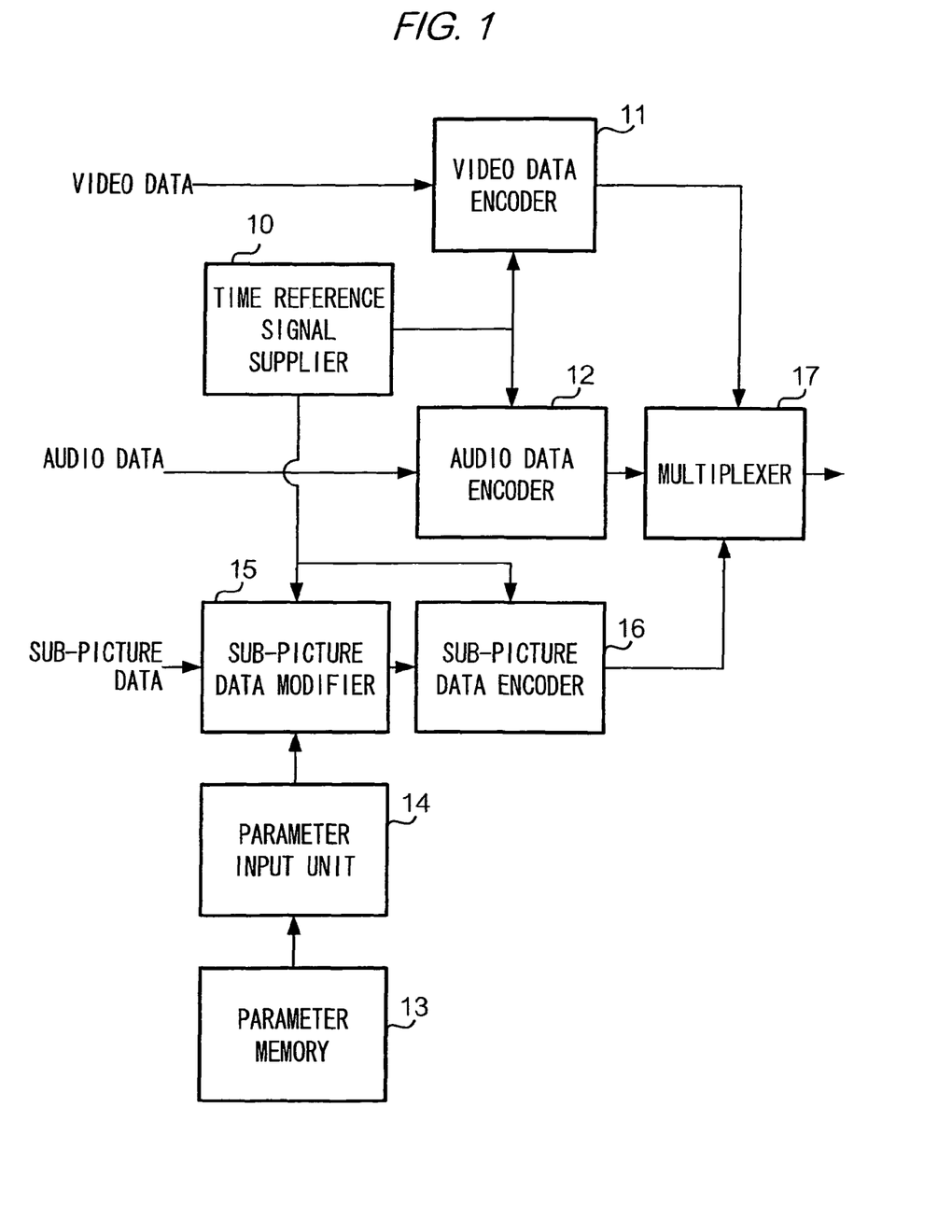
FIG. 1 is a schematic diagram of a hardware configuration of a stereoscopic parameter embedding apparatus.

FIG. 1 is a block diagram showing a schematic diagram of a hardware configuration of the stereoscopic parameter embedding apparatus. As shown in the drawing, the apparatus includes: time reference signal supplier 10; video data encoder 11; audio data encoder 12; parameter memory 13; parameter input unit 14; sub-picture data modifier 15; sub-picture data encoder 16; and multiplexer 17.

Time reference signal supplier 10 supplies components of the parameter embedding apparatus with time reference signal t indicating a time that has elapsed since the beginning of reproduction of video content. The components of the apparatus synchronize actions for e.g. encoding of data with reference to the time reference signal t. Intervals at which the time reference signal t is supplied correspond to intervals at which a frame change of video data takes place. For example, in a case where 30 frames of video data are switched per second, time reference signal t is provided at 1/30 seconds.

In video data encoder 11 video data is input sequentially, and the encoder applies compression coding to the input video data in conformity with MPEG (Moving Picture Experts Group) standards. The video data input in video data encoder 11 is a sequence of sets of raster data and a time stamp. The raster data sets represent, as a bitmap, a video image for a respective frame; and the time stamp represents a timing of reproduction of the video image.

In audio data encoder 12 audio data is input sequentially, and the encoder encodes the input audio data without compressing it. The audio data input in audio data encoder 12 consists of a sequence of sets of event data, and a time stamp. The event data represents attributes of audio to be produced, and the time stamp represents a timing of processing the event data.

The operations of video data encoder 11 and audio data encoder 12 are well known from the prior art, and accordingly, detailed description thereof is omitted here.

Parameter memory 13 stores sets of stereoscopic parameters with a time stamp. The stereoscopic parameters are parameters for converting a video image (two-dimensional image) represented by video data for each frame into a stereoscopic image, and consist of 11 different types of parameters, such as a depth-value (z-value) of each object drawn in a video image and a correction value for correcting a depth-value of an object in accordance with attributes of the object. The stereoscopic parameters consist of text data obtained through analysis of a video image represented by video data for each frame in accordance with a given algorithm, and the obtained stereoscopic parameters are stored in parameter memory 13 in association with a time stamp associated with the analyzed video image. The given algorithm is known in the prior art, and accordingly, detailed description thereof will be omitted.

Parameter input unit 14 reads out, sequentially, a set of stereoscopic parameters and a time stamp from parameter memory 13, and inputs them to sub-picture data modifier 15.

In sub-picture data modifier 15 sub-picture data is input sequentially, and the modifier embeds stereoscopic parameters in the input sub-picture data and provides the thus modified data to sub-picture data encoder 16. The sub-picture data is, unlike the above-mentioned video data, a sequence of sets of raster data and control data. The raster data represent a sub-picture to be combined with a video image as a bitmap, and the control data represent a control method of the sub-picture. More specifically, the raster data consist of sets of attribute data of each pixel forming the bitmap and an address of the pixel. A pixel forming subtitles and a pixel forming background have different attribute data. Control data contain a time stamp representing the timing of starting and terminating of display of the sub-picture, and color codes specifying a color of subtitles and a background color. The color code is a code specifying any of 16 colors including white (a transparent color). The control data can contain up to four sets of a color code and an attribute value of a pixel. For example, in a case where in raster data, subtitles are formed by pixels associated with attribute value a, and background are formed by pixels associated with attribute value b, and where in control data, attribute value a is associated with a color code of black, and attribute value b is associated with a color code of white, subtitles of the sub-picture are displayed in black and a background is displayed in white (a transparent color). In typical sub-pictures, the color of subtitles is black, and the background color is white (transparent color); however, there are some cases where a color code associated with a certain attribute value changes depending on a video image combined with the sub-picture.

Figure 2:
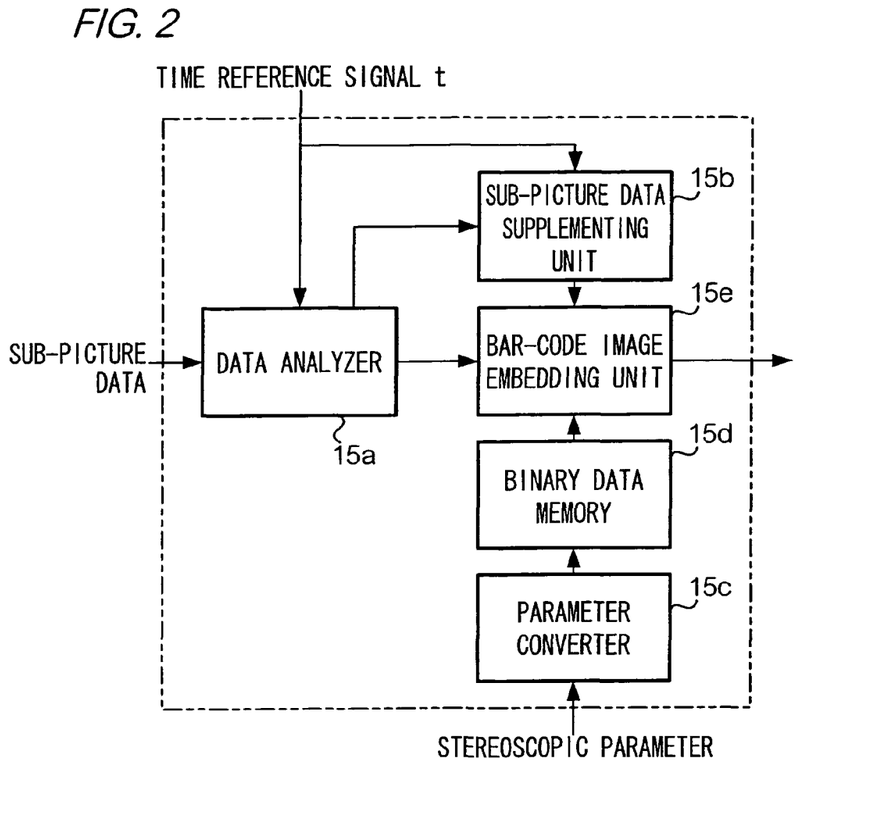
FIG. 2 is a hardware configuration diagram of sub-picture data modifier 15.

FIG. 2 is a block diagram showing a hardware configuration of sub-picture data modifier 15. As shown in the drawing, sub-picture data modifier 15 includes: data analyzer 15a;

sub-picture data supplementing unit 15b; parameter converter 15c; binary data memory 15d; and bar-code image embedding unit 15e.

Data analyzer 15a distinguishes, by referring to control data contained in sub-picture data, between a time area where subtitles have been added and a time area where no subtitle has been added, and in the former time area, adds a new time stamp to the input sub-picture data before outputting it. Specifically, analyzer 15a updates a time stamp (a time stamp representing the timing of starting display and the timing of terminating display) contained in the control data of the sub-picture data with a time indicated by time reference signal t before outputting the sub-picture data. Accordingly, in a time area where subtitles have been added, a sequence of sub-picture data is output, wherein raster data have not been changed and times indicated by time stamps contained in their control data are successive. On the other hand, in a time area where no subtitle has been added, sub-picture data and a signal for instructing supplementing of the sub-picture data are provided to sub-picture data supplementing unit 15b.

Sub-picture data supplementing unit 15b, while the signal is being provided from data analyzer 15a to instruct supplementing sub-picture, generates new sub-picture data and outputs the data to bar-code image embedding unit 15e. Raster data of the new sub-picture data does not contain data of subtitles. A set of a color code and an attribute value contained in control data of the sub-picture is the same as that of sub-picture data provided from data analyzer 15a. A time stamp contained in the control data indicates the same time as that indicated by time reference signal t. Namely, in a time area where subtitles have not been added, a sequence of sub-picture data is output, wherein raster data does not have data of subtitles and times indicated by time stamps contained in their control data are successive.

Parameter converter 15c converts stereoscopic parameters into binary data. Specifically, parameter converter 15c converts a stereoscopic parameter into eight bits of binary data and stores the binary data in binary data memory 15d in association with a time stamp associated with the stereoscopic parameter. Stereoscopic parameters according to the present embodiment consist of 11 different types of parameters; accordingly, as a result of a single conversion, 88 bits of binary data are stored in binary data memory 15d.

When binary data for all of 11 types of parameters is stored in binary data memory 15d, bar-code image embedding unit 15e generates bar-code image data corresponding to the binary data, and embeds the bar-code image data in raster data contained in sub-picture data provided from data analyzer 15a or sub-picture data supplementing unit 15b.

Figure 3:
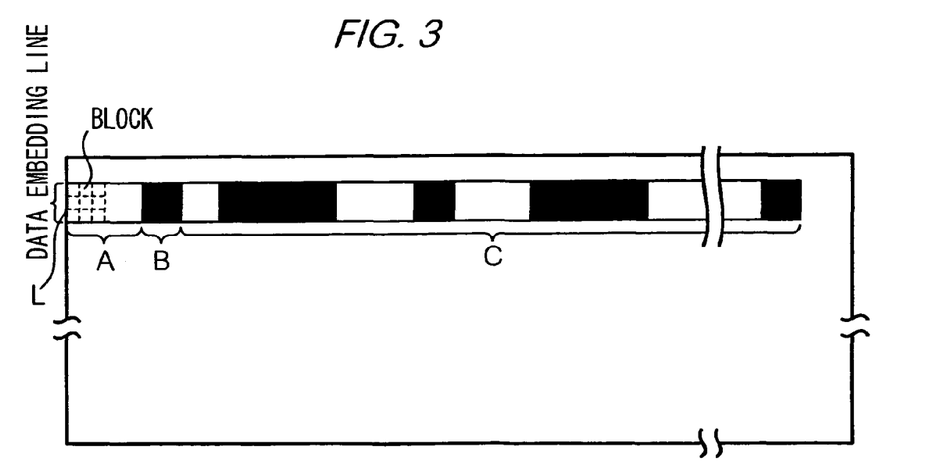
FIG. 3 is a diagram showing a sub-picture in which a bar-code image is embedded.

FIG. 3 is a diagram showing a sub-picture where a bar-code image is embedded by bar-code image embedding unit 15e.

As shown in the drawing, a bar-code image is embedded in a line of the third to fifth pixels from the top (hereinafter, referred to as "data embedding line") of a bitmap of a sub-picture. In the data embedding line, blocks of three-by-three pixels (total nines pixels) are arranged laterally. Each block corresponds to a bit of binary data which is binary-digitalized stereoscopic parameters. The color of nine pixels forming each block is associated with the color of either subtitles or background, and it is determined on the basis of the color of the block whether binary data represents "1" or "0".

As shown in FIG. 3, two blocks from the left extremity L of the data embedding line is secured as first leading mark picture area A, and one block adjoining the right side of the area A is secured as second leading mark picture area B. Pixels in first leading mark picture area A are all associated with the color of background, and pixels in second leading mark picture area B are all associated with the color of subtitles. The marks are not used for representing the content of binary data, which is binary-digitalized stereoscopic parameters, but rather are used for indicating a starting point of the binary data. An area adjoining the right side of second leading mark picture area B is secured as area C for representing the content of binary data. Pixels in the area C form laterally successive 88 blocks, and pixels in each block are associated with the color of subtitles or background.

Figure 4:
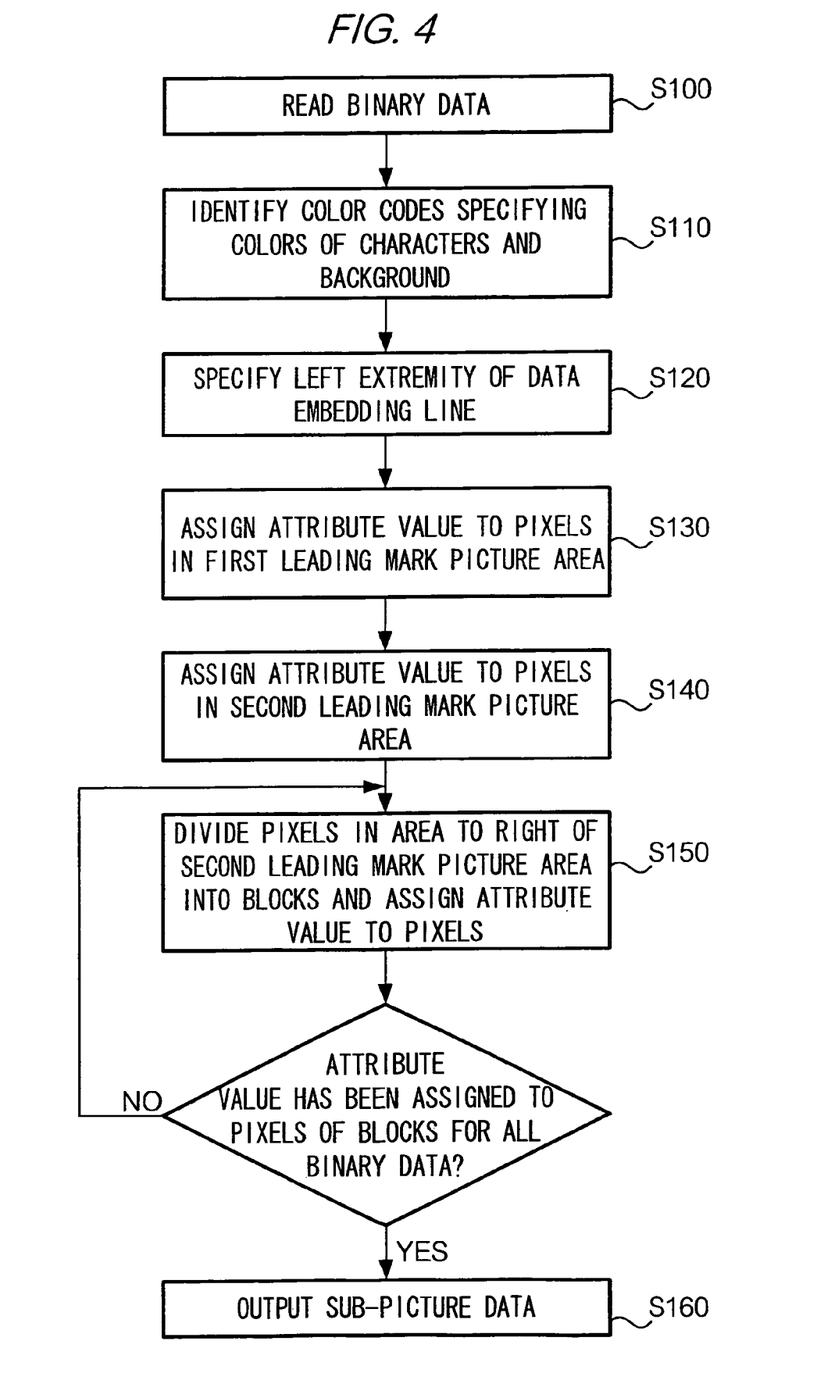
FIG. 4 is a flowchart illustrating a data embedding process performed by bar-code image embedding unit 15e.

FIG. 4 is a flowchart of an operation performed by bar-code image embedding unit 15e.

At step 100, when sub-picture data is input from data analyzer 15a or sub-picture supplementing unit 15b, bar-code image embedding unit 15e refers to a time stamp contained in control data of the sub-picture data and reads out binary data associated with the same time stamp from binary data memory 15d.

At step 110, bar-code image embedding unit 15e identifies, with reference to the control data of the input sub-picture data, color codes specifying the color of subtitles and the color of background. At step 120, bar-code image embedding unit 15e specifies left extremity L of a data embedding line of a bitmap represented by raster data contained in the sub-picture data.

At step 130, bar-code image embedding unit 15e specifies an area of two blocks laterally from left extremity L as first leading mark picture area A, and assigns to all pixels in the specified area, an attribute value corresponding to the color code of the color of background identified at step 110. For example, if the color code of the color of background indicates white (a transparent color), an attribute value representing white (a transparent color) is assigned to the pixels.

At step 140, bar-code image embedding unit 15e specifies an area of one block adjoining the right side of the first leading mark picture area as second leading mark picture area B, and assigns to all pixels in the specified area, an attribute value corresponding to the color code of the color of subtitles identified at step 110. For example, if the color code of the color of subtitles indicates black, an attribute value representing black is assigned to the pixels, and if the color code indicates blue, an attribute value representing blue is assigned.

At step 150, bar-code image embedding unit 15e divides pixels in an area adjoining the right side of second leading mark picture area B into blocks, and assigns to pixels in each block, an attribute value corresponding to the color code of either subtitles or background identified at step 110. Which attribute is assigned to the pixels is decided on the basis of the binary data read at step 100. For example, if the first piece of the binary data read at step 100 represents "1", an attribute value corresponding to the color code of the color of subtitles is assigned to nine pixels in a block adjoining on the right side of the second leading mark picture area. On the other hand, if the first piece of the binary data read at step 100 represents "0", an attribute value corresponding to the color code of the color of background is assigned. Bar-code image embedding unit 15e refers to subsequent pieces of the binary data also, and assigns an attribute value to pixels in a block corresponding to each piece of the binary data in a similar manner. When assignment of an attribute value to pixels in blocks corresponding to all pieces of binary data is completed, at step 160 bar-code image embedding unit 15e outputs the sub-picture data processed as described above to sup-picture data encoder 16.

Bar-code image embedding unit 15e performs the operation as described above each time sub-picture data is input from data analyzer 15a or sub-picture supplementing unit 15b.

Returning to description of FIG. 1, sub-picture data encoder 16 applies a variable length coding on sub-picture data input from sub-picture data modifier 15.

Multiplexer 17 multiplexes code strings output from video data encoder 11, audio data encoder 12, and sub-picture data encoder 16 to generate video content data which is a signal string conforming to DVD standards.

(DVD Shipping Process)

In the present process, the generated video content data is provided to a DVD manufacturing factory, and DVDs storing the video content data are shipped from the factory into the market.

(Video Content Obtaining Process)

In the present process, a user owing a stereoscopic image reproducer purchases a DVD in the shop, and inserts the DVD into the DVD drive of the stereoscopic image reproducer.

(Stereoscopic Image Displaying Process)

The stereoscopic image displaying process is an operation performed by the stereoscopic image reproducer. When the user inserts the DVD into the DVD drive of the stereoscopic image reproducer, selects a reproduction system between a stereoscopic image reproduction mode and a two-dimensional image reproduction mode using a reproduction system selector (not shown), and instructs start of play of the DVD, the stereoscopic image displaying process is started.

Figure 5:
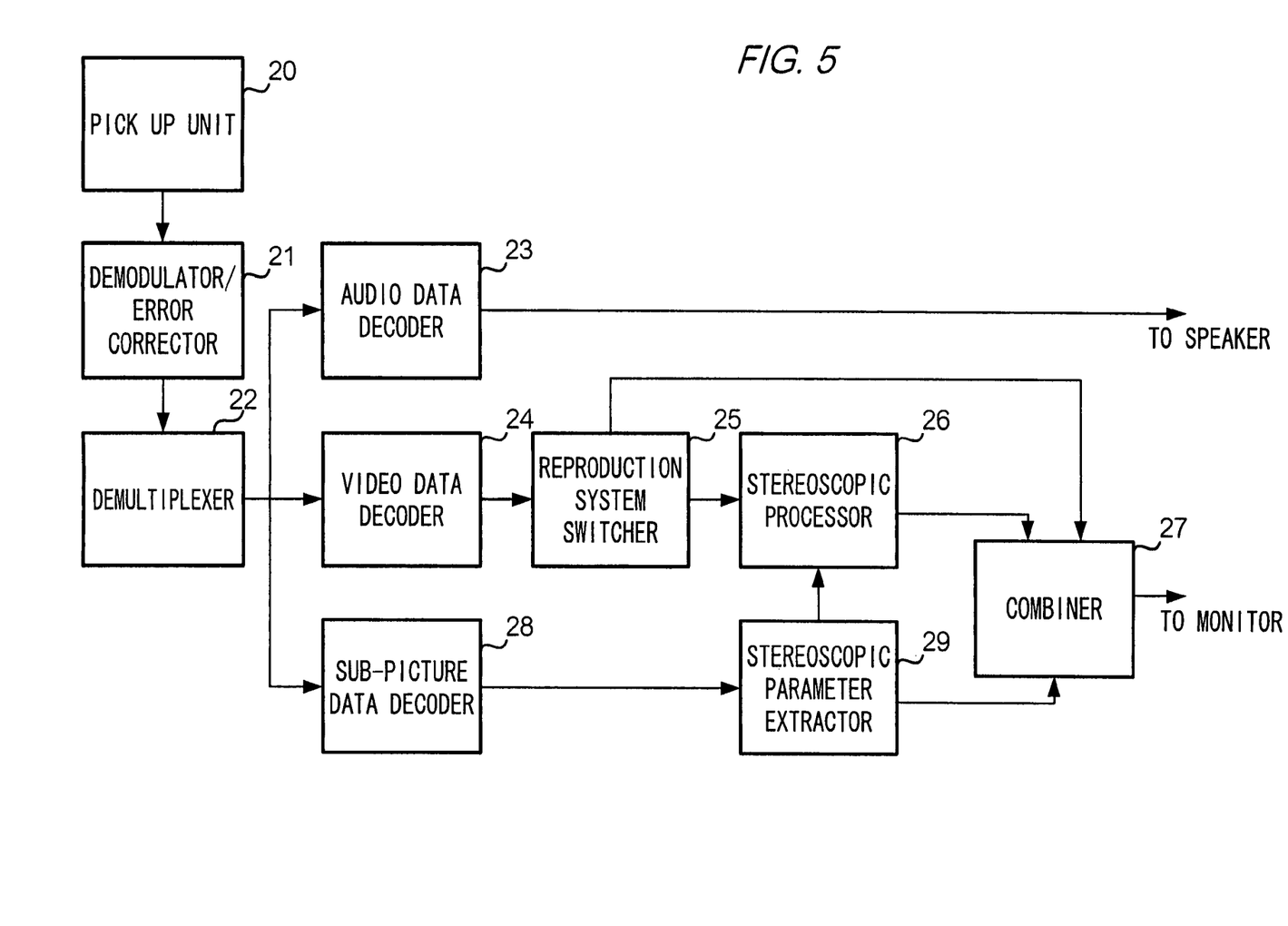
FIG. 5 is a schematic diagram of a hardware configuration of a stereoscopic image reproducer.

FIG. 5 is a schematic block diagram of a hardware configuration of the stereoscopic image reproducer. As shown in the drawing, the stereoscopic image reproducer includes: pick up unit 20; demodulator/error corrector 21; demultiplexer 22; audio data decoder 23; video data decoder 24; reproduction system switcher 25; stereoscopic processor 26; sub-picture decoder 28; stereoscopic parameter extractor 29; and combiner 27.

An outline of an operation of the stereoscopic image reproducer is as follows.

The video content data stored in the DVD inserted into the DVD drive is picked up by pick up unit 20. An output from pick up unit 20 is demodulated by demodulator/error corrector 21, and input to demultiplexer 22. Demultiplexer 22 divides the video content data input from pick up unit 20 into compression-coded signals of audio data, video data, and sub-picture data, and provides the compression-coded signals of audio data to audio data decoder 23, the compression-coded signals of video data to video data decoder 24, and the compression-coded signals of sub-picture data to sub-picture data decoder 28.

The compression-coded signals of audio data are decoded by audio data decoder 23 and provided to a speaker. Specifically, the compression-coded signals are decoded into audio data containing sets of event data representing attributes of audio to be produced and a time stamp representing the timing of processing the event data, and provided to the speaker.

The compression-coded signals of video data are decoded by video data decoder 24 and provided to reproduction system switcher 25. Specifically, the compression-coded signals are decoded into video data containing raster data representing a video image and a time stamp representing the timing of reproducing the video image, and provided to reproduction system switcher 25. Reproduction system switcher 25 outputs the provided video data to stereoscopic processor 26 or directly to combiner 27. The path of the video data is switched in accordance with a reproduction system pre-selected by the reproduction system selector (not shown). Specifically, if the stereoscopic image reproduction mode is pre-selected, the video data is output to stereoscopic image processor 26, and if the two-dimensional image reproduction mode is pre-selected, the video data is output directly to combiner 27.

Stereoscopic processor 26, when the video data is input from reproduction system switcher 25, applies a stereoscopic imaging process on the video data using stereoscopic parameters provided from stereoscopic parameter extractor 29. Specifically, stereoscopic processor 26 generates an image for a left eye and an image for a right eye, which have a given disparity therebetween, on the basis of depth-values included in the stereoscopic parameters and their correction values, and combines the disparity images. The stereoscopic-imaging-process-applied video data is provided to combiner 27.

The compression-coded signals of sub-picture data are decoded by sub-picture decoder 28 and provided to stereoscopic parameter extractor 29. Specifically, the compression-coded signals are decoded into sub-picture data containing sets of raster data representing a sub-picture in which a bar-code image is embedded and control data of the sub-picture, and provided to stereoscopic parameter extractor 29. The control data may contain color codes specifying a color of subtitles and a background color, and a time stamp for associating the sub-picture and corresponding video data. The stereoscopic parameter extractor 29 extracts stereoscopic parameters from the input sub-picture data and provides them to stereoscopic processor 26, and provides the sub-picture data to combiner 27.

Combiner 27 combines the video data input from reproduction system switcher 25 or stereoscopic processor 26 with the sub-picture data input from stereoscopic parameter extractor 29, and provides the resultant data to a monitor.

The above is an outline of components of the stereoscopic image reproducer. Below, operation of stereoscopic parameter extractor 29, which performs a characteristic operation of the present embodiment, will now be described in detail.

Figure 6:
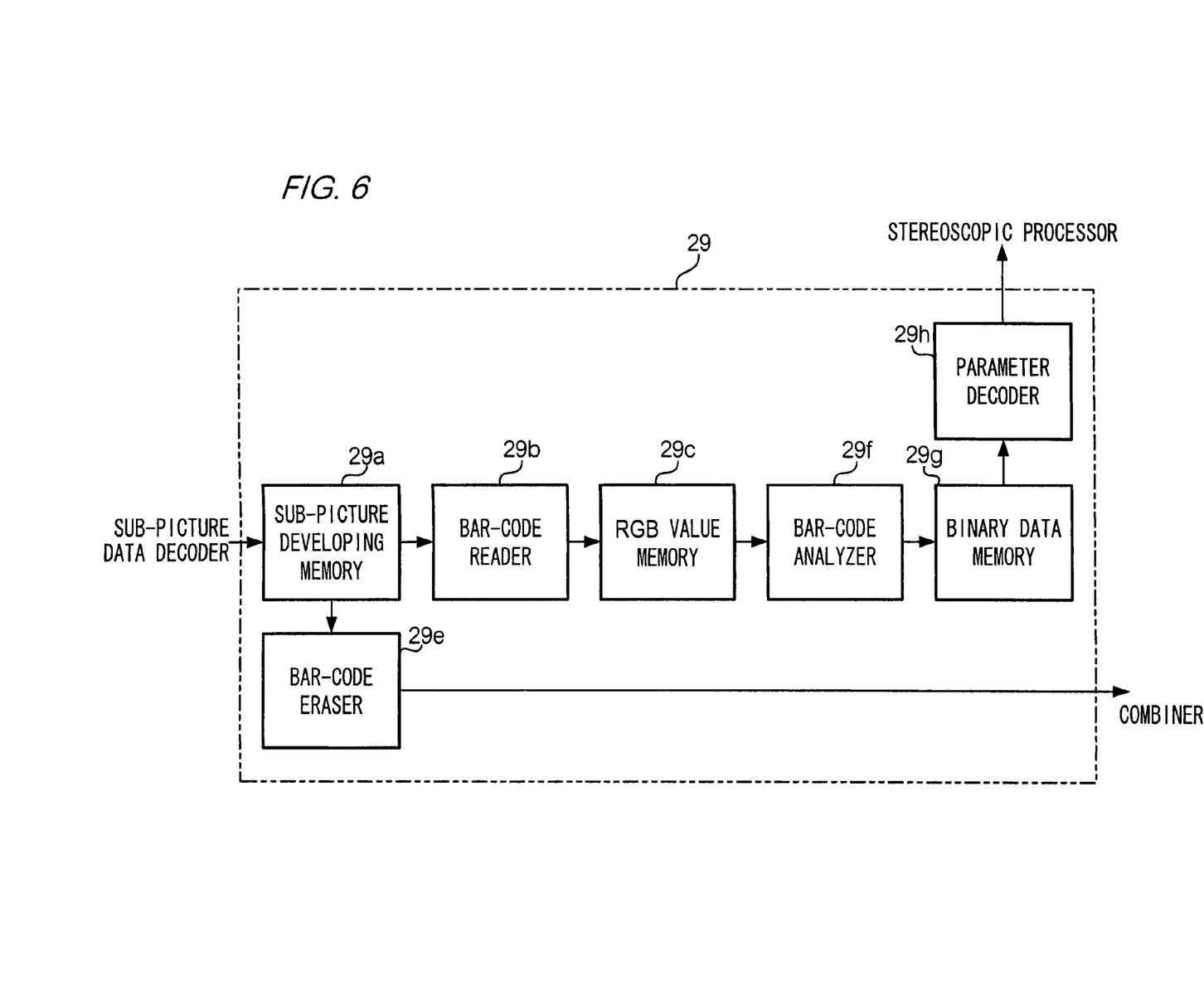
FIG. 6 is a hardware configuration diagram of a stereoscopic parameter extractor.

FIG. 6 is a block diagram showing a detailed hardware configuration of stereoscopic parameter extractor 29. As shown in the drawing, stereoscopic parameter extractor 29 includes: sub-picture developing memory 29a; bar-code reader 29b; RGB value memory 29c; bar-code eraser 29e; bar-code analyzer 29f; binary data memory 29g; and parameter decoder 29h.

In sub-picture developing memory 29a a sub-picture represented by the raster data contained in the sub-picture data is developed as a bitmap. In the data embedding line located at the top of the developed bitmap, a bar-code image is drawn, as shown in FIG. 3.

Bar-code reader 29b reads data of the bar-code image from the bitmap developed in sub-picture developing memory 29a, and stores RGB values corresponding to the data of the bar-code image in RGB value memory 29c. Specifically, bar-code reader 29b performs an operation as described below.

Bar-code reader 29b identifies a starting point of the bar-code image on the bitmap developed in sub-picture developing memory 29b. As described above with reference to FIG. 3, pixels in two blocks from the left extremity of the data embedding line, which are first leading mark picture area A, are drawn in the background color, and pixels in one block adjoining the right side of first leading mark picture area A, which is second leading mark picture area B, are drawn in the color of subtitles. Accordingly, bar-code reader 29b identifies the data embedding line (a line of the third to fifth pixels from the top), and refers to pixels in a direction towards the right from the left extremity L. When identifying pixels of a block (three pixels) not having the background color, bar-code reader 29b identifies the right edge of the block as the starting point of the bar-code image. Bar-code reader 29b reads pixels of the data embedding line optically from the identified starting point, and stores an RGB value in RGB value memory 29c in association with the address of each pixel. The RGB value is evaluated in 255 tones for each of R (Red), G (Green), and B (Blue). As an RGB value of a pixel becomes closer to RGB (0, 0, 0), the color of the pixel becomes closer to white, and as an RGB value of a pixel becomes closer to RGB (255, 255, 255), the color of the pixel becomes closer to black.

Bar-code eraser 29e, after bar-code reader 29b completes the storage of RGB values of pixels in RGB value memory 29c, modifies the raster data contained in the sub-picture data to erase the bar-code image from the data embedding line. Specifically, bar-code eraser 29e writes attribute values of three lines under the data embedding line (a line of the sixth to eighth pixels from the top) over attribute values in the data embedding line. The thus modified sub-picture data is provided to combiner 27.

Bar-code analyzer 29f generates binary data from the RGB values of pixels stored in RGB memory 29c, and stores the generated binary data in binary data memory 29g.

Figure 7:
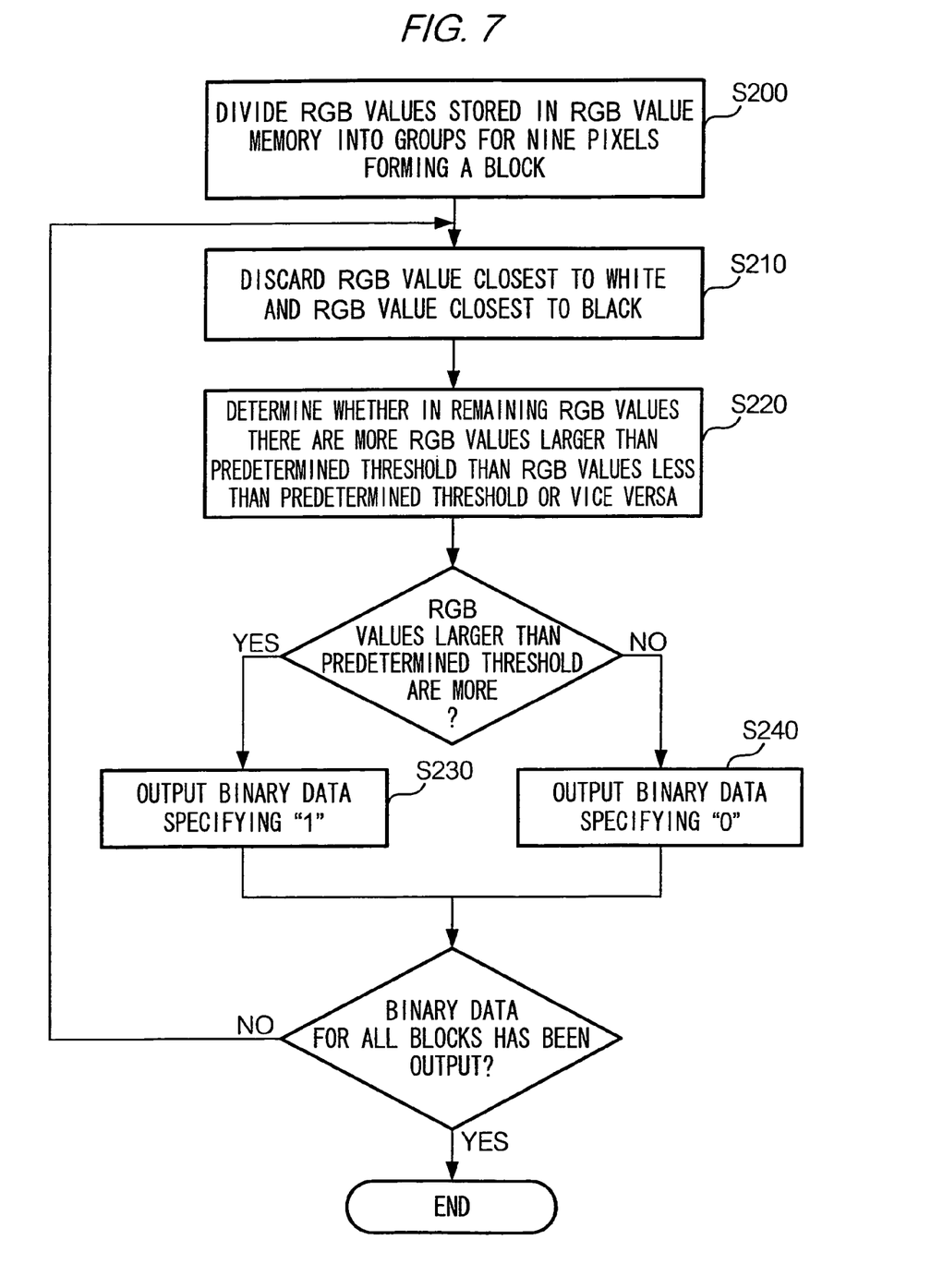
FIG. 7 is a flowchart illustrating a process performed by a bar-code analyzer.

FIG. 7 is a flowchart of an operation performed by bar-code analyzer 29f.

At step 200, bar-code analyzer 29f divides the RGB values stored in RGB value memory 29c into groups for each block of nine pixels. Of these groups, the group of pixels closest to the starting point of the bar-code image is the first to be subjected to a subsequent process.

At step 210, bar-code analyzer 29f selects one group and discards, from among RGB values of pixels belonging to the group, an RGB value closest to white (0, 0, 0) and an RGB value closest to black (255, 255, 255).

At step 220, bar-code analyzer 29f determines whether, of the remaining seven RGB values, there are more RGB values larger than a predetermined threshold than RGB values smaller than the threshold, or vice versa. The threshold depends on a color code associated with pixels forming sub-titles in a control code contained in sub-picture data. For example, in a case where an attribute value of pixels forming subtitles is associated with a color code of black, the threshold is set to 64, which is the average of an RGB value. Bar-code analyzer 29f calculates the average of an R value, a G value, and a B value for each of the seven pixels, and determines whether, of the calculated values, there are more values larger than 64 than values smaller than 64, or vice versa. In a case where an attribute value of pixels forming subtitles is associated with a color code of blue, the threshold is set to 64 and is considered against only a B value of a pixel. Bar-code analyzer 29f determines whether of the seven B values there are more B values larger than 64 than B values smaller than 64, or vice versa.

If there are more RGB values larger than the threshold, at step 230 bar-code analyzer 29f determines that the pixels of the group being processed correspond to "1" and stores binary data representing "1" in binary data memory 29g.

On the other hand, if there are more RGB values larger than the threshold, at step 240 bar-code analyzer 29f determines that the pixels of the group in process correspond to "0" and stores binary data representing "0" in binary data memory 29g.

After storing the binary data, bar-code analyzer 29f proceeds to select a group of pixels forming a subsequent block and to apply the operation from step 210 through step 240 to the group. The operation from step 210 through step 240 is repeated until binary data corresponding to all blocks are stored.

In binary data memory 29g binary data ("1" or "0") output from bar-code analyzer 29f are stored sequentially. When the above operation is performed by bar-code analyzer 29f, a total of 88 pieces of binary data are generated from data of one sub-picture, and the sequence of binary data is stored in binary data memory 29g. For example, a sequence of binary data corresponding to the first eight blocks from the starting point of the bar-code shown in FIG. 3 is "01110010". On the basis of eight successive pieces of binary data, a parameter is decoded, as described above.

Returning to description of FIG. 6, when binary data corresponding to all blocks are stored in the binary data memory, parameter decoder 29h reads binary data from binary data memory 29g in chronological order, starting with the earliest, and decodes eight pieces of binary data at a time. Namely, parameter decoder 29h converts eight successive pieces of binary data into text to obtain the original parameters. Parameter decoder 29h provides the restored parameters to stereoscopic processor 26. Stereoscopic processor 26 effects the parameters on video data provided from video data decoder 24 as a stereoscopic imaging process.

In the present embodiment, in the video content creation process, a creator obtains video data, audio data, and sub-picture data, which are source data of video content data to be stored in a DVD, and by analysis of video images of the video data, obtains stereoscopic parameters for converting the video images to stereoscopic images. The creator embeds the stereoscopic parameters in the sub-picture data and multiplexes the pieces of data to generate video content data. In the stereoscopic image displaying process, a user selects a reproduction system between the stereoscopic image reproduction mode and the two-dimensional image reproduction mode, and instructs playing of the DVD. In a case where the stereoscopic image reproduction mode is selected, a stereoscopic image reproducer identifies the bar-code image embedded in the sub-picture data, applies a stereoscopic imaging process to the video data using parameters restored from the bar-code image, and causes combiner 27 to output the resultant video data. In a case where the two-dimensional image reproduction mode is selected, the stereoscopic image reproducer causes combiner 27 to output the video data without applying the stereoscopic imaging process to it.

As described above, since video data and stereoscopic parameters for generating stereoscopic images on the basis of the video data are contained separately in video content data, the video content data can be reproduced to be viewed either stereoscopically or two-dimensionally.

Also, in the present embodiment, stereoscopic parameters are converted into binary data and embedded in sub-picture data as a bar-code image where a bit of binary data is expressed in nine pixels. The bar-code image is read optically by a stereoscopic image reproducer, and the stereoscopic parameters are restored from the read bar-code image. Accordingly, the stereoscopic parameters can be reproduced with great accuracy.

Also, in the present embodiment, a stereoscopic parameter embedding apparatus, when embedding bar-code image data in sub-picture data, identifies the colors of subtitles and background with reference to control data contained in the sub-picture data, and embeds a bar-code image in accordance with the identified colors. Consequently, the color of subtitles of a sub-picture is always the same as that of the bar-code image embedded in the sub-picture data. Accordingly, a problem can be avoided that a change of the color of subtitles makes the recognition rate of a bar-code image low.

(Other Embodiments)

The invention of the present application can be modified in various ways.

In the above embodiment, video images represented by video data are analyzed to obtain stereoscopic parameters, and bar-code image data corresponding to the stereoscopic parameters is embedded in sub-picture data. However, the bar-code image data may be embedded in the video data. If the bar-code image data is embedded in the video data, the stereoscopic parameters restored from the bar-code image data and video data can be matched with a high degree of accuracy.

The present modification is useful for storing video content data in a medium such as a video tape which is not capable of storing multiple types of data, unlike a DVD. If bar-code image data is embedded in video data, images can be viewed via such a medium either stereoscopically or two-dimensionally, as in the above embodiment.

In the above, embodiment, generated video content data is shipped for marketing in DVD format. However, the video content data may also be distributed via a network for a fee.

In the stereoscopic parameter embedding apparatus according to the above embodiment, video content data is generated by hardware logic. However, a stereoscopic parameter embedding program for realizing functions of components shown in FIG. 1, namely, time reference signal supplier 10; video data encoder 11; audio data encoder 12; parameter input unit 14; sub-picture data modifier 15; sub-picture data encoder 16; and multiplexer 17 may be provided in a personal computer to cause a CPU of the computer to execute the same operations as those of the components.

Similarly, a stereoscopic image reproduction program for realizing functions of components shown in FIG. 5, namely, demultiplexer 22; audio data decoder 23; video data decoder 24; reproduction system switcher 25; stereoscopic processor 26; sub-picture decoder 28; stereoscopic parameter extractor 29; and combiner 27 may be provided in a personal computer to cause a CPU of the computer to execute the same operations as those of the components.

The stereoscopic image reproduction program may be stored in DVD format together with video content data in the video content creation process of the above embodiment, and shipped for marketing. Storage of the stereoscopic image reproduction program in DVD format enables a personal computer not having the program already installed to install it automatically and play the DVD in the stereoscopic image displaying mode.

In the above embodiment, moving picture data such as MPEG data is subject to a stereoscopic imaging process. However, two-dimensional static image data such as JPEG (Joint Photographic Experts Group) data and GIF (Graphic Interchange Format) data may be subjected to the stereoscopic imaging process. In this case, the static image data is analyzed to obtain stereoscopic parameters, and a bar-code image corresponding to the parameters is embedded in the static image data.

What is claimed is:

1. A stereoscopic parameter embedding apparatus comprising:
   a video image input unit operable to input a plurality of pieces of sequentially correlated video image data to be processed sequentially;
   a parameter input unit operable to input stereoscopic parameters for converting a video image into a stereoscopic image, each parameter being associated respectively with each of the plurality of pieces of sequentially correlated video image data;
   a converter operable to convert each of the input stereoscopic parameters into binary data; and
   an embedding unit operable to embed bar-code image data corresponding to the binary data in each of the plurality of pieces of sequentially correlated video image data.

2. A stereoscopic parameter embedding apparatus comprising:
   a sub-picture input unit operable to input sub-picture data to be combined with each of a plurality of pieces of sequentially correlated video image data to be processed sequentially;
   a parameter input unit operable to input stereoscopic parameters for converting a video image into a stereoscopic image, each parameter being associated respectively with each of the plurality of pieces of sequentially correlated video image data;
   a converter operable to convert each of the input stereoscopic parameters into binary data; and
   an embedding unit operable to embed bar-code image data corresponding to the binary data in each of the pieces of sub-picture data.

3. The stereoscopic parameter embedding apparatus according to claim 2 further comprising:
   a video image input unit operable to input a plurality of pieces of sequentially correlated video image data to be combined with the sub-picture data; and
   a video content data preparing unit operable to prepare video content data of signals, wherein the sub-picture data with the embedded bar-code image data and the video image data input via the video image input unit are multiplexed in accordance with predetermined standards.

4. A stereoscopic image reproducer comprising:
   a reader operable to read sequentially correlated video image data to be processed sequentially from a non-transitory computer readable medium, the non-transitory computer readable medium comprising the video image data and bar-code image data, the bar-code image data being prepared through conversion of stereoscopic parameters for converting a video image into a stereoscopic image, into binary data;
   a bar-code identifying unit operable to identify the bar-code image data embedded in the read video image data;
   a parameter extracting unit operable to analyze the identified bar-code image data and extract the stereoscopic parameters;
   a stereoscopic processor operable to apply a stereoscopic imaging process on the video image data, the stereoscopic imaging process effecting the extracted stereoscopic parameters on the video image data in which the bar-code image data of the stereoscopic parameters is embedded; and
   an output unit operable to output the stereoscopic-process-applied video image data to a display in a predetermined sequence.

5. A stereoscopic image reproducer comprising:
   a reader operable to read video content data from a non-transitory computer readable medium, the video content data comprising sequentially correlated video image data to be processed sequentially, and sub-picture data to be combined with the video image data and in which bar-code image data is embedded, the bar-code image data being prepared through conversion of stereoscopic parameters for converting a video image into a stereoscopic image, into binary data;
   an extracting unit operable to extract the video image data and the sub-picture data from the read video content data;
   a bar-code identifying unit operable to identify the bar-code image data embedded in the extracted sub-picture data;
   a parameter extracting unit operable to analyze the identified bar-code image data and extract the stereoscopic parameters;

a stereoscopic processor operable to apply a stereoscopic imaging process on the video image data, the stereoscopic imaging process effecting the extracted stereoscopic parameters on the video image data to be combined with the sub-picture data where the bar-code image data of the stereoscopic parameters is embedded;

a combiner operable to combine the stereoscopic-process-applied video image data with the sub-picture data; and an output unit operable to output the video image data with the combined sub-picture data to a display in a predetermined sequence.

6. The stereoscopic image reproducer according to claim 5, further comprising a bar-code eraser operable to alter the sub-picture data to erase the bar-code image data after the bar-code data is analyzed and the stereoscopic parameters are extracted from the bar-code image data, wherein the combiner combines the video image data with the altered sub-picture data.

7. The stereoscopic image reproducer according to claim 5, further comprising a reproduction system switcher operable to switch between reproduction of video image data for stereoscopic viewing and reproduction of video image data not for stereoscopic viewing, wherein the combiner, if reproduction of video image data for stereoscopic viewing is selected by the reproduction system switcher, combines the stereoscopic-process-applied video image data with the sub-picture data, and if reproduction of video image data not for stereoscopic viewing is selected by the reproduction system switcher, combines the pre-stereoscopic-process video image data with the sub-picture data.

8. A non-transitory computer readable medium embedded with a program that, when executed, causes a computer including: (a) a video image input operable to input a plurality of pieces of sequentially correlated video image data to be processed sequentially, and (b) a parameter input unit operable to input stereoscopic parameters for converting a video image into a stereoscopic image, each of which is associated with each of the plurality of pieces of sequentially correlated video image data, to:

convert each of the stereoscopic parameters input via the parameter input unit into binary data; and embed bar-code image data corresponding to the binary data in video image data input via the video image input unit.

9. A non-transitory computer readable medium embedded with a program that, when executed, causes a computer including: (a) a sub-picture unit operable to input sub-picture data to be combined with each of a plurality of pieces of sequentially correlated video image data to be processed sequentially, and (b) a parameter input unit operable to input stereoscopic parameters for a video image into a stereoscopic image, each parameter being associated with each of the plurality of pieces of sequentially correlated video image data, to:

convert each of stereoscopic parameters input via the parameter input unit into binary data; and embed bar-code image data corresponding to the binary data in sub-picture data input via the sub-picture input unit.

10. A non-transitory computer readable medium embedded with a program that, when executed, causes a computer including: (a) a reader operable to read sequentially correlated video image data to be processed sequentially from a computer readable medium, the computer readable medium comprising the sequentially correlated video image data and bar-code image data, the bar-code image data being prepared through conversion of stereoscopic parameters for converting a video image into a stereoscopic image, into binary data, and (b) a display operable to display a video image, to:

identify the bar-code image data embedded in video image data read by the reader;

analyze the identified bar-code image data to extract stereoscopic parameters;

apply a stereoscopic imaging process to the video image data, the stereoscopic imaging process effecting the extracted stereoscopic parameters on the video image data in which the bar-code image data of the stereoscopic parameters is embedded; and output the stereoscopic-process-applied video image data to the display in a predetermined sequence.

11. A non-transitory computer readable medium embedded with a program that, when executed, causes a computer including: (a) a reader operable to read video content data from a computer readable medium, the video content data comprising sequentially correlated video image data to be processed sequentially, and sub-picture data to be combined with the video image data and in which bar-code image data is embedded, the bar-code image data being prepared through conversion of stereoscopic parameters for converting a video image into a stereoscopic image, into binary data, and (b) a display operable to display a video image to:

extract the video image data and the sub-picture data from the video content data read via the reader;

identify the bar-code image data embedded in the extracted sub-picture data;

analyze the identified bar-code image data to extract stereoscopic parameters;

apply a stereoscopic imaging process on the video image data, the stereoscopic imaging process effecting the extracted stereoscopic parameters on the video image data to be combined with the sub-picture data in which the bar-code image data of the stereoscopic parameters is embedded;

combine the stereoscopic-process-applied video image data with the sub-picture data; and output the video image data with the combined sub-picture data to the display in a predetermined sequence.

12. A method of distributing video content data, comprising:

generating video content data representing signals by a first computer comprising a video image input unit operable to input a plurality of pieces of sequentially correlated video image data to be processed sequentially, a sub-picture input unit operable to input sub-picture data to be combined with each of the plurality of pieces of sequentially correlated video image data, and a parameter input unit operable to input stereoscopic parameters for converting a video image into a stereoscopic image, each of which is associated with each of the pieces of plurality of video image data, the step of generating video content data comprising converting stereoscopic parameters input from the sub-picture input unit into binary data, embedding bar-code image data corresponding to the binary data in sub-picture data input from the sub-picture input unit, and multiplexing the sub-picture data in which the bar-code image data is embedded and video image data input from the video image input unit in conformity with predetermined standards to generate the signals, storing the video content data in a non-transitory computer readable medium and shipping it;

causing the video content data stored in the computer readable medium to be processed by a second computer capable of reproducing the video content data; and displaying a stereoscopic image of a video image by the second computer comprising extracting the video image data and the sub-picture data from the video content data read from the computer readable medium, identifying the bar-code image data embedded in the extracted sub-picture data, analyzing the identified bar-code image data and extracting the stereoscopic parameters, applying a stereoscopic imaging process to the video image data, the stereoscopic imaging process effecting the extracted stereoscopic parameters on the video image data to be combined with the sub-picture data in which the bar-code image data of the stereoscopic parameters is embedded, combining the stereoscopic-imaging-process-applied video image data with the sub-picture data, and outputting the video image data with the combined sub-picture data to a display in a predetermined sequence.

13. A stereoscopic parameter embedding apparatus comprising:
an image input unit operable to input sequentially correlated two-dimensional video image data;
a parameter input unit operable to input stereoscopic parameters for converting a two-dimensional video image into a stereoscopic image;
a converter operable to convert each of the input stereoscopic parameters into binary data; and
an embedding unit operable to embed bar-code image data corresponding to the binary data in the input two-dimensional video image data.

14. A stereoscopic image reproducer comprising:
a reader operable to read sequentially correlated two-dimensional video image data from a non-transitory computer readable medium, the non-transitory computer readable medium comprising video image data in which bar-code image data is embedded, the bar-code image data being prepared through conversion of stereoscopic parameters for converting a two-dimensional video image into a stereoscopic image, into binary data;
a bar-code identifying unit operable to identify the bar-code image data embedded in the read two-dimensional video image data;
a parameter extracting unit operable to analyze the identified bar-code image data and extract the stereoscopic parameters;
a stereoscopic processor operable to apply a stereoscopic imaging process to the two-dimensional video image data, the stereoscopic imaging process effecting the extracted stereoscopic parameters on the two-dimensional image data in which the bar-code image data of the stereoscopic parameters is embedded; and
an output unit operable to output the stereoscopic-process-applied video image data to a display in a predetermined sequence.

15. A non-transitory computer readable medium embedded with a program that, when executed, causes a computer including: (a) an image input unit operable to input sequentially correlated two-dimensional video image data, and (b) a parameter input unit operable to input stereoscopic parameters for converting a two-dimensional video image into a stereoscopic image, to
convert each of the stereoscopic parameters input via the parameter input unit into binary data; and
embed bar-code image data corresponding to the binary data in the two-dimensional image data input via the video image input unit.

16. A non-transitory computer readable medium embedded with a program that, when executed, causes a computer including: (a) a reader operable to read sequentially correlated two-dimensional video image data from a non-transitory computer readable medium, the non-transitory computer readable medium comprising the sequentially correlated two-dimensional image data in which bar-code image data is embedded, the bar-code image data being prepared through conversion of stereoscopic parameters for converting a two-dimensional video image into a stereoscopic image, into binary data, and (b) a display operable to display an image, to
identify the bar-code image data embedded in the two-dimensional image data read by the reader;
analyze the identified bar-code image data to extract stereoscopic parameters;
apply a stereoscopic imaging process on the two-dimensional image data, the stereoscopic imaging process effecting the extracted stereoscopic parameters on the two-dimensional image data in which the bar-code image data of the stereoscopic parameters is embedded; and
output stereoscopic image data generated through the stereoscopic process to the display.

* * * * *